Dec. 19, 1961          G. R. MILLIGAN          3,013,830
PACKING
Filed June 27, 1958
Fig. 1.
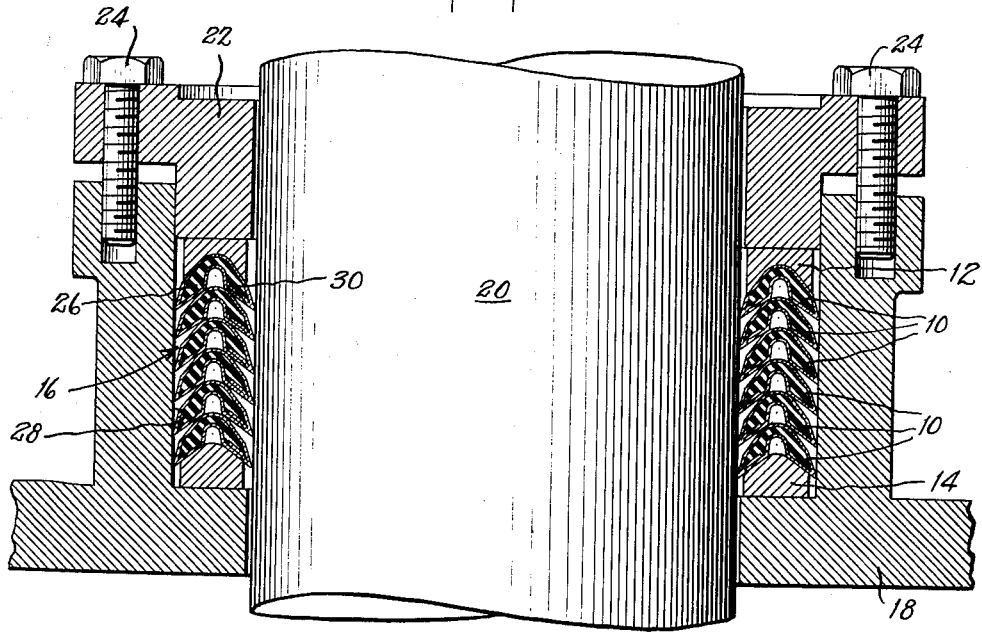
Fig. 2.
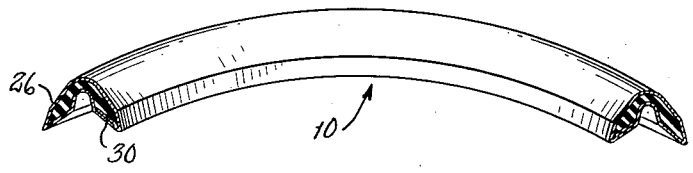
Fig. 3.
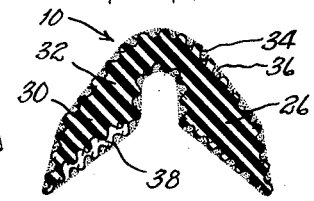
Fig. 4.          Fig. 5.          Fig. 6.
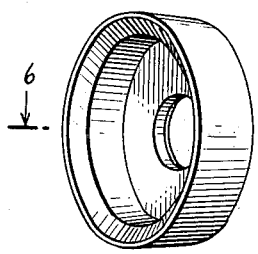 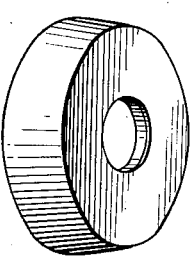 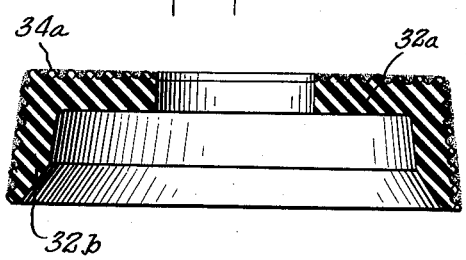
INVENTOR:
GEORGE R. MILLIGAN
BY
                    ATTORNEY 3,013,830
PACKING
George R. Milligan, Palmyra, N.Y., assignor to Garlock Inc., a corporation of New York
Filed June 27, 1958, Ser. No. 745,069
7 Claims. (Cl. 288—17)

This invention relates to an improved packing such as is used, for example, between relatively movable machine parts, to oppose leakage of lubricant or other fluid (often under pressure) between those parts.

An important object of the invention is the provision of such a packing which has extremely low frictional engagement with a relatively movable machine part and, hence, minimizes drag between related, relatively movable machine parts.

Another important object is the provision of such a packing which, when used with another packing conforming to this invention, is capable of some sliding action of some of its portions in relation to said other packing or portions thereof.

Another important object is the provision of a more durable packing.

Another important object is the provision of an assembly of packings wherein several related packings in the assembly are so constructed and arranged that slippage therebetween enhances the functioning of the assembly as a whole.

The foregoing and other more or less obvious objects and advantages are achieved by this invention of which certain embodiments are shown and described herein for illustrative purposes without, however, limiting the invention to those particular embodiments.

In the accompanying drawing:

FIGURE 1 is an axial, sectional view of a packing assembly according to a preferred embodiment of this invention, in association with relatively movable machine parts which are only fragmentarily shown.

FIG. 2 is a fragmentary cross-sectionalized, perspective view, of packing, according to this invention, of the character illustrated in FIG. 1.

FIG. 3 is an enlarged, cross-sectional view of the packing included in FIG. 1 and shown in FIG. 2.

FIGS. 4 and 5 are perspective views showing, respectively, the inside and the outside of another form of packing according to this invention; this form being designed for use as a piston cup or packing.

FIG. 6 is an enlarged, cross-sectional view of the piston cup illustrated in FIGS. 4 and 5, substantially on the line 6—6 of FIG. 4.

Referring to FIGS. 1–3, the packing assembly is shown as comprising a plurality of similar, somewhat pliant or deformable packing rings 10, of approximate U-shape in cross section. These rings internest to some extent with each other, and the top and bottom rings of the assembly internest, respectively, with top and bottom rigid adapter rings 12 and 14; all the mentioned rings being confined in a stuffing box 16 formed in an outer machine element or casing 18 within which a rod or shaft 20 reciprocates or rotates. The mentioned ring assembly is retained within the stuffing box by a gland 22 which may be urged downwardly or inwardly of the stuffing box by screws 24 to place the packing-ring assembly under suitable axial compression.

Each of the packing rings 10 has an outer sealing lip 26 in substantially static or only slightly shiftable sealing engagement with inner cylindrical surface 28 of the stuffing box 16, and an inner sealing lip 30 in slidable sealing engagement with the cylindrical, outer surface of the rod or shaft 20.

When packings of the general character just described are used, the concave or inner end faces of the rings 10 are usually caused to face the direction from which the pressure of the sealed lubricant or fluid emanates. Hence, it may be assumed that the pressure or the sealed fluid seeking to pass between the shaft 20 and the casing 18 is upwardly directed as viewed in the drawing. Such pressure, finding its way into the stuffing box, acts upon the bottom or inner surfaces of lips 26 and 30 to urge those lips, respectively, outwardly into firm, well-maintained sealing engagement with cylindrical surface 28 and inwardly into firm, well-maintained sealing engagement with the rod or shaft 20.

The packing assembly and the parts associated therewith are not represented to be novel as thus far described. There is novelty, however, in certain features of the rings 10 and of their manufacture, and of their cooperation with each other and with associated machine parts.

Referring particularly to FIG. 3, the packing ring 10 is molded to its illustrated or more or less equivalent shape. It has a core 32 of relatively soft rubber or rubber-like material (all such materials being hereinafter referred to for convenience merely as "rubber") preferably completely encased within an envelope 34 of fibrous fabric, the outer surface areas of which are covered or filled as at 36 with compressed polytetrafluoroethylene. The method of making such rings and the novel results of using such rings will now be described.

The rings 10 or equivalent rings may be manufactured by frictioning one side of a suitably shaped sheet of fabric, which is to become the envelope 34, and wrapping that sheet, with its frictioned side facing inwardly, about a circular blank of uncured rubber, which is to become the core 32. Then, finely divided or powdered polytetrafluoroethylene is applied to the entire outer surface of the fabric, whereafter the thus-enveloped blank is molded in suitable dies to its ring shape and to the cross-sectional shape shown in FIG. 3.

The fabric may be cotton or other fibrous material and, if desired, may include asbestos to increase its capacity to endure heat. The fabric should be of fine enough weave to enable it to substantially oppose outward passage of core rubber therethrough during the molding operation or in use.

The mentioned frictioning of the inner surface of the fabric may be accomplished merely by brushing or wiping, upon said surface, and somewhat into the interstices at the inner side of the fabric, a suitable rubber-like substance which may function as an adhesive in effectively uniting the fabric envelope 34 to the rubber core 32 during the molding operation. In some circumstances, as where the selected fabric is of a character which quite readily adheres to rubber, the application of a rubber-like adhesive substance to the inner surface of the fabric may be omitted.

The fabric should preferably be so shaped and so applied to the rubber-core blank that marginal portions of the fabric overlap at points or areas which are not to be in sealing engagement with an adjacent machine part. Thus, such overlap is preferably at the inner side of one of the sealing lips 26 or 30, being shown in the drawing as so located at 38 on lip 30.

The powdered polytetrafluoroethylene may conveniently be applied to the fabric envelope, before the molding operation, in the form of a suspensoid wherein the powdered polytetrafluoroethylene is admixed with water or other suitable liquid. The suspensoid may be brushed onto the outer surface of the fabric envelope 34 or a fabric-enveloped blank may be dipped into and agitated in the suspensoid. As thus applied, the polytetrafluoroethylene finds its way into the interstices at the outer side of the fabric and completely covers the envelope 34. The suspensoid-coated blank is molded only after the suspensoid has dried sufficiently to avoid material steaming in the mold. With some types of fabric envelopes it may be feasible, within this invention, to apply the powdered polytetrafluoroethylene in its dry state to the outer surface of the envelope 34 before the molding operation, although the application of the polytetrafluoroethylene in suspensoid is considered more thoroughly effective.

After the thus-treated blank has been properly subjected to heat and pressure in the molding operation, it is released from the mold. It should here be noted that the low coefficient of friction of the outer surface of the resultant packing, arising from its coating of polytetrafluoroethylene, enables the substantially finished packing to be released readily from the mold without the necessity of employing any special mold-release agent.

Having in mind that the finished packing rings 10 are completely coated with polytetrafluoroethylene which has a low coefficient of friction, it may be understood that each such ring would exert little or no drag upon the moving rod or shaft 20; and that an entire assembly of such packing rings would impose only a greatly reduced drag, thereby utilizing most efficiently the power provided for moving said rod or shaft. The reduced friction also minimizes or obviates scoring of the rod or shaft by the packing.

In prior assemblies of U-shaped packing rings in stuffing boxes, the surfaces of the packing rings were such that upon continued application of pressure axially upon the assembly, the several packing rings would substantially seize each adjacent ring so that the assembly would become more of a unitary packing than a desired assembly of packing rings. Where such assemblies and their component packing rings accord to this invention, each packing ring is capable of some slippage relatively to each adjacent ring, thereby permitting each packing ring to shift slightly in a radial direction to compensate for wear which might occur at one point in the one ring and not at a corresponding point in an adjacent ring.

This permissible slippage between rings also enables the sealing lips 26 and 30 to flex with relative freedom of inhibition which, in prior packings, arises from the axially compressed condition of the packing assembly. In prior packings wherein slippage between rings is not present, flexing of a sealing lip was substantially localized toward its edge while in packings according to this invention wherein such slippage is present, such flexing of either the outer or the inner sealing lip may occur throughout the entire area between the lip's edge and the center of the packing ring. As the efficiency of U-packing assemblies arises largely from the flexibility of the sealing lips of the packing rings, it will readily be realized that the enhanced flexibility of the sealing lips, in packing according to this invention, leads to substantially improved operating conditions.

There is believed to be a significant advantageous result arising from the fact that interstices of the inner face of the fabric of the envelope 34 are filled with rubber while interstices of the outer face of that fabric are filled with polytetrafluoroethylene. The advantageous result is that the polytetrafluoroethylene is well retained in the fabric although it would be expected that powdered polytetrafluoroethylene, because of its nature, would not be well retained in the fabric but would fall away, and thereby fail to serve any purpose. There appears to be good reason to believe that the presence of rubber, filling all the inner interstices, while permitting adequate flexing of the sealing ring, nevertheless, limits such flexing to rather substantial radii. Thus, powdered polytetrafluoroethylene, which might be caused to escape from the packing ring if the latter or parts thereof were sharply bent, is retained by the packing ring, according to this invention, by reason of the fact that rubber, in said inner interstices, holds the ring against sharp bends. In that situation, the outer interstices remain substantially unaffected by flexing of the packing ring or parts thereof and effectively retain the polytetrafluoroethylene or very substantial portions thereof for the purposes of this invention.

The embodiment illustrated in FIGS. 4–6 yields some advantages although not all of the advantages hereinbefore indicated. In said embodiment, a fabric envelope 34a constitutes an outer covering for a flat piston-cup body 32a of rubber and an integral, more or less cylindrical, rubber, sealing flange 32b. The envelope 34a, however, does not extend about the inside of the rubber parts 32a, 32b. It is associated with said rubber parts, however, by having the rubber of parts 32a, 32b, or intervening rubber-like adhesive material, filling the interstices of the inner face of the envelope 34a. Similarly to the first-described embodiment, the outer surface of the envelope 34a is covered with and the interstices of the latter surface are filled with polytetrafluoroethylene, applied to or introduced thereinto as hereinbefore suggested with respect to said first embodiment.

In the second embodiment, the presence of the polytetrafluoroethylene minimizes friction at the outer surface of the sealing flange, thereby conserving power and minimizing wear of said flange and of the cylinder wall in sliding contact with said flange.

Although, in the disclosed embodiments, the core 32 (FIG. 3) and the body and flange 32a and 32b (FIG. 6) are described as being of rubber, those familiar with the art will realize that the just-mentioned parts may include reinforcing fabric in the rubber, in addition to the fabric envelope of this invention.

It will be understood that the present inventive concept may be utilized in various other ways without, however, departing from the invention as set forth in the following claims.

I claim:

1. A packing comprising a flexible body including rubber therein, fibrous fabric adherently disposed upon a surface of said body, and finely divided polytetrafluoroethylene on the outer face of said fabric and substantially occupying the fabric's interstices at said outer face.

2. A packing according to claim 1, further including adhesive material between said body and said fabric.

3. A packing comprising a flexible body including rubber therein and at an outer area thereof, fibrous fabric overlying said outer area of said body, the interstices of the side of said fabric which faces said body being substantially occupied by portions of said rubber, thereby securing said fabric to said body, and compacted, finely divided particles of polytetrafluoroethylene on the outer face of said fabric and substantially filling interstices of said fabric at said outer face.

4. An annular packing comprising an annular, flexible body of rubber including an integral, annular sealing flange, fibrous fabric adherently overlying upon said body and flange with rubber of said body and flange substantially occupying interstices of the adjacent face of said fabric, and finely divided polytetrafluoroethylene compacted and held within interstices of the outer face of said fabric and extending to the surface of said outer face to constitute the latter as a sealing surface.

5. A packing of U-shape in cross-section, comprising a rubber core having opposite sealing flanges corresponding generally to opposite portions of a U and a connecting portion interconnecting said flanges, fibrous fabric adherently and intimately overlying the outer faces of said flanges and connecting portion with rubber of the latter and of said flanges extending substantially into interstices of the inner face of said fabric, and powdered polytetrafluoroethylene substantially occupying interstices of the outer face of said fabric and substantially covering said outer face.

6. A packing according to claim 5, said packing being an annulus and said fabric also intimately overlying the inner faces of said flanges and connecting portion with core rubber at said inner faces extending substantially into interstices of adjacent inner surfaces of said fabric, and the outer interstices of the fabric which overlies said inner faces of said flanges being substantially filled with powdered polytetrafluoroethylene.

7. A piston cup comprising a flat, annular body of rubber, an approximately cylindrical, rubber sealing flange integral with and adjoining the outer periphery of said body, fibrous fabric adherently covering the outer faces of said body and flange, and finely divided polytetrafluoroethylene substantially occupying interstices of the outer surface of said fabric and substantially covering said outer surface.

References Cited in the file of this patent

UNITED STATES PATENTS

| | | |
|---|---|---|
| 204,860 | Symonds | June 11, 1878 |
| 1,246,089 | Greenoe | Nov. 13, 1917 |
| 1,700,091 | Bruce | Jan. 22, 1929 |
| 1,969,008 | Hubbard | Aug. 7, 1934 |
| 2,173,744 | Payne | Sept. 19, 1939 |
| 2,400,533 | Buffington | May 21, 1946 |
| 2,459,721 | Poltorak | Jan. 18, 1949 |
| 2,591,383 | Spalding | Apr. 1, 1952 |
| 2,716,034 | Main | Aug. 23, 1955 |
| 2,774,621 | Kilbourne | Dec. 18, 1956 |
| 2,804,886 | White | Sept. 3, 1957 |
| 2,907,612 | White | Oct. 6, 1959 |

OTHER REFERENCES

Product Engineering, September 1952, pages 149–153. (Copy in Classification Division V.)